United States Patent [19]

Rude et al.

[11] 4,427,100
[45] Jan. 24, 1984

[54] REVERSIBLE TOOL HANDLE

[75] Inventors: Edward T. Rude, Fairfield; Jules Nisenson, Stamford; Martin Waine, Riverside, all of Conn.

[73] Assignee: General Clutch Corp., New York, N.Y.

[21] Appl. No.: 358,338

[22] Filed: Mar. 15, 1982

[51] Int. Cl.³ .................... F16D 13/08; F16D 41/20; B25B 15/00
[52] U.S. Cl. ...................................... 192/43; 81/63.1; 192/41 S; 192/81 C
[58] Field of Search ................. 192/41 S, 43, 81 C, 192/75, 76; 81/58, 63.1; 145/70, 76

[56] References Cited

U.S. PATENT DOCUMENTS

| | | | |
|---|---|---|---|
| 2,415,050 | 1/1947 | Starkey | 192/43 |
| 2,533,848 | 12/1950 | Swilik | 192/41 S |
| 3,372,781 | 3/1968 | Fulton | 192/43 |
| 3,920,106 | 11/1975 | Nisenson | 192/43 X |
| 4,341,292 | 7/1982 | Acevedo | 192/43 |
| 4,341,293 | 7/1982 | Acevedo | 192/43 |
| 4,372,432 | 2/1983 | Waine et al. | 192/43 X |

Primary Examiner—Rodney H. Bonck
Attorney, Agent, or Firm—Gottlieb, Rackman & Reisman

[57] ABSTRACT

A bi-directional spring clutch having a cylindrical input element mounted on a cylindrical output element, with a wrap spring disposed between them. A control element, in the form of a cylinder, is rotatably mounted on the input element for assuming one of three discrete positions relative to the input element. A key on the control element extends through a window of the input element and is disposed between the ends of the wrap spring. When the control element is in either of its extreme positions, turning of the input element controls tightening of the spring and the transmission of torque, the direction of torque transmission depending upon the position of the control element. Rotation of the input element in the opposite direction results in the key unwrapping the spring so that there is not torque transmission. When the control element is in its middle position, the key bears against neither end of the spring, and torque is transmitted in both directions of rotation of the input element.

20 Claims, 9 Drawing Figures

REVERSIBLE TOOL HANDLE

DESCRIPTION

The present invention relates to wrap spring clutch devices and, more particularly, to tool handles which use them.

There are a variety of tool handles which can be used to apply torque to a tool bit in one direction and yet allow the handle to be rotated easily in the reverse direction while the tool bit remains stationary. Such tool handles are capable of holding a wide variety of bits or blades, and are commonly found in the tool kits carried by installation and field service personnel. They are popular because light weight and compactness are at a premium in these tool kits which, ordinarily, must be moved several times each day, always by hand. The blades which can be used in such handles cover a wide range, including all of the various types of screwdrivers, socket wrenches, Allen and other types of key wrenches, taps, and other special purpose devices.

Prior art tool handles of this type often include reversible rachets of various kinds. Reversible ratchets allow the user to move the tool and the handle together in one direction, and yet rotate the handle in the opposite direction without moving the tool in that opposite direction. Ratchets, however, have several disadvantages. Among these are their inherent complexity, excessive friction, and large lost motion. Lost motion results from the fact that ratchet wheels have discrete teeth. Any angular motion of the grip which does not terminate with the engagement of a tooth by a pawl is wasted motion since no torque will be transmitted until that extra level has been reversed.

These disadvantages can be overcome by the use of a wrap spring clutch in place of the ratchet mechanism. A number of prior art patents disclose the use of wrap spring clutches in tool handles. In some of these, two springs are used, one for each direction of rotation. The extra spring is an added expense and an unnecessary complication. In others, the element which controls the directionality of the device engages an attachment to the spring itself, the torque being transmitted from the grip through this contol element to the attachment on the spring and, thereby, to the tool bit. Since this control element must be easily moveable, clearances are necessary between it and the adjoining elements to provide for the manufacturing tolerances in the several parts. These clearances result in backlash and a feeling of looseness in the handle. Reduction of these clearances can be accomplished only by the use of very close manufacturing tolerances and careful fitting of the parts during assembly, making this design approach prohibitively expensive.

U.S. Pat. No. 2,415,050 discloses a clutch with a control element which allows the clutch to drive a load in only one direction at a time or to lock the clutch for driving in either direction. In this clutch configuration, however, the input element is coupled to the clutch by means of pins. These pins must be heavy enough to bear the entire working load of the device and yet there must be sufficient clearance to permit easy movement of the control element on the input shaft. Since this sliding motion is perpendicular to the rotation which occurs in using the device, clearance is required so that the control element can slide into position to engage the spring. U.S. Pat. No. 3,372,781 discloses a tool handle which also uses a wrap spring clutch to disengage the blade from the handle in one direction or the other. The control element in this case is also a part of the load-bearing chain of elements. This design has the same need for clearances as that discussed above, and both designs exhibit a degree of lost motion large enough to reduce their utility considerably. It is an object of our invention to arrange the elements of a wrap spring clutch so as to eliminate all of the lost motion between the control element and the end of the spring which it engages, thereby minimizing the overall most motion in the tool handle.

It is another object of our invention to provide a wrap spring clutch whose control element is not part of the load-bearing chain of elements.

Friction within the clutch of a tool handle reduces the freedom of rotation of the grip with respect to the blade in the direction of rotation in which slippage is desired, and if this friction is too large it defeats the entire purpose of the tool handle. The external device on which the tool is being used will normally exert at least a small amount of resistance to rotation, and the utility of the tool is in some measure determined by the amount of this resisitive torque which the external device must apply to the blade to keep it stationary during the rotation of the grip in the free direction. To minimize this requirement for resistive torque, a carefully wound spring is needed. The individual turns of the relaxed spring should be in good alignment. In addition, it is important that the smallest possible wire size be used in making the spring so that the force required to expand the spring be as small as possible. This requirement for a small wire size introduces another complication into the making of clutches of this sort, since reducing the size of the wire also reduces its strength. Most clutch designs, including those described above, pay little attention to the strength required in the spring wire at its ends where the external forces are applied to the spring. If the clutch is to work easily in the free direction, small wire must be used. However, if the wire is small, then merely bending over the ends of the wire will not provide a spring end to which large forces can be applied.

It is another object of our invention to provide a wrap spring clutch for a tool handle which does not suffer from the disadvantages described above, and yet is no more costly or complex to manufacture than prior art wrap spring clutch tool handles.

Briefly, in accordance with the principles of our invention, a bi-directional wrap spring clutch connects the grip of the tool handle to the blade holder. The clutch allows the user to choose the direction in which the tool handle will operate. In the preferred embodiment of the invention, the part of the clutch used to determine the direction of operation, that is, the control element, is a cylindrical sleeve called the shift cylinder. The shift cylinder can be rotated about the grip axis to any of these positions. With the shift cylinder set for clockwise operation, the blade moves with the grip as the grip is rotated in the clockwise direction and the blade can remain stationary while the grip is rotated in the counterclockwise direction. The shift cylinder can also be set for counterclockwise operation in which case the blade moves with the grip during counterclockwise wise rotation of the grip, and can remain stationary during clockwise rotation of the grip. The shift cylinder can also be set to a third, intermediate, position in which the blade and the grip move together for either direction of rotation. When the shift cylinder is set so that the grip and the blade move together in a given direction, then that direction is herein called the "driving direction", and the reverse direction is called the "free direction".

An important feature of our invention is that the shift cylinder is positioned so that it is not under a significant load during the operation of the handle, and there is no lost motion between the spring attachment and the shift cylinder. This design feature improves the operation of the tool handle over designs in which the control element is a part of the chain of elements bearing the working loads.

Further objects, features and advantages of our invention will become apparent upon consideration of the following detailed description in conjunction with the drawings, in which.

Figure 1:
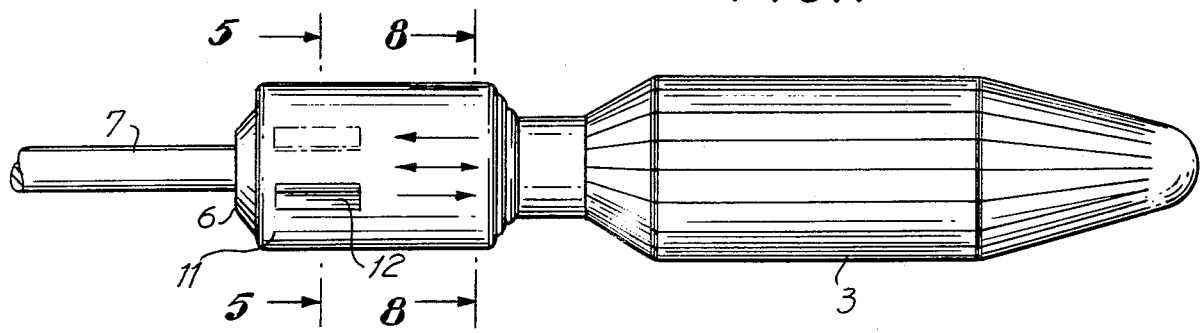
FIG. 1 is a view of the tool handle showing the shift cylinder and the markings which indicate the three positions in which the shift cylinder can be set.
Figure 2:
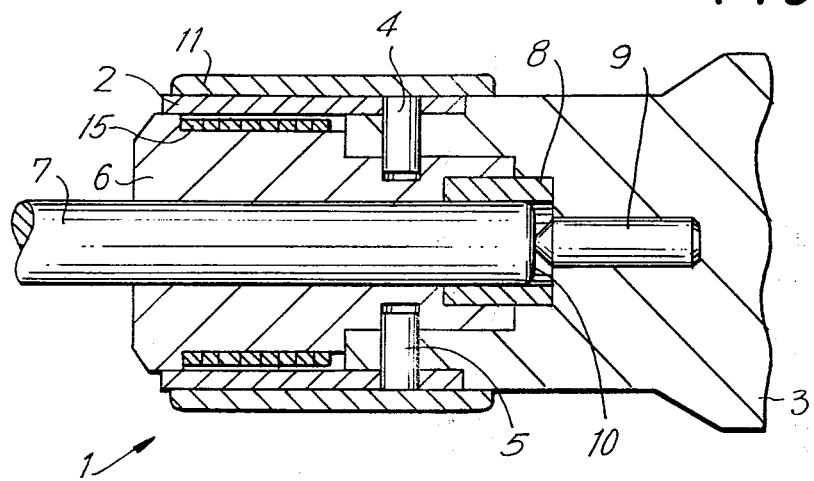
FIG. 2 is a cross-sectional view of the tool handle.
Figure 5:
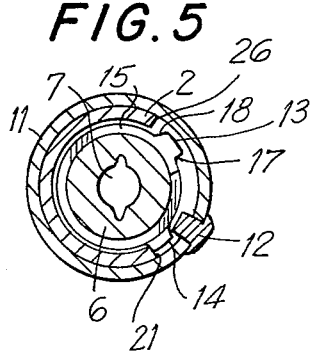
FIG. 5 is a cross-sectional view taken through line 5—5 in FIG. 1, in which the shift cylinder is set to advance a right handed screw.
Figure 6:
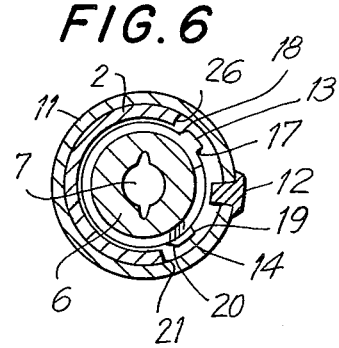
FIG. 6 is a cross-sectional view similar to that of FIG. 5, but in which the shift cylinder of the clutch is set to lock the handle to the blade for both directions of rotation.
Figure 7:
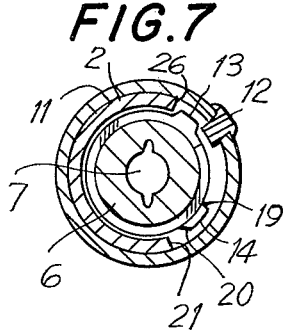
FIG. 7 is a cross-sectional view similar to that of FIG. 5, but in which the shift cylinder of the clutch is set to remove a right handed screw.

The present invention is based on the use of a wrap spring clutch, of the type described in Patent Application Ser. No. 244,975, filed on Mar. 18, 1981 and entitled "Bi-Directional clutch", which application issued as U.S. Pat. No. 4,372,432 on Feb. 8, 1983 and is hereby incorporated by reference. Referring to FIGS. 1 and 2, input cylinder 2 of clutch 1 is fixed in grip 3 of the tool handle by means of pins 4 and 5. Pins 4 and 5 also protrude into a groove in output hub 6, thereby allowing the output hub freedom to rotate while retaining it in the handle. The tool blade, or bit, 7 is held in position by retaining sleeve 8. Retaining sleeve 8 is a conventional split ring of plastic which expands slightly when the blade is inserted and grips the blade with sufficient frictional force to keep it in place in the axial direction during use. When the grip is rotated in the driving direction, the clutch must transmit torque from the grip to the blade. The torque carrying connection between output hub 6 of the clutch and blade 7 is made by standard type mating features on the stem of the blade and output hub 6 into which it is inserted, as shown in FIGS. 5-7.

Axial loading of the handle might otherwise produce frictional forces within the clutch which can prevent the blade from remaining stationary when the grip is rotated in the free direction. To prevent this from happening, pin 9, which fits into a hole in the grip, acts as a thrust bearing against which the end of the blade rests. When the grip rotates and the blade remains stationary, frictional forces will develop at bearing point 10 in FIG. 2. The end of pin 9 has a small diameter so that any frictional force produced at point 10 by rotation of the grip will exert a negligible torque on the blade.

Figure 3:
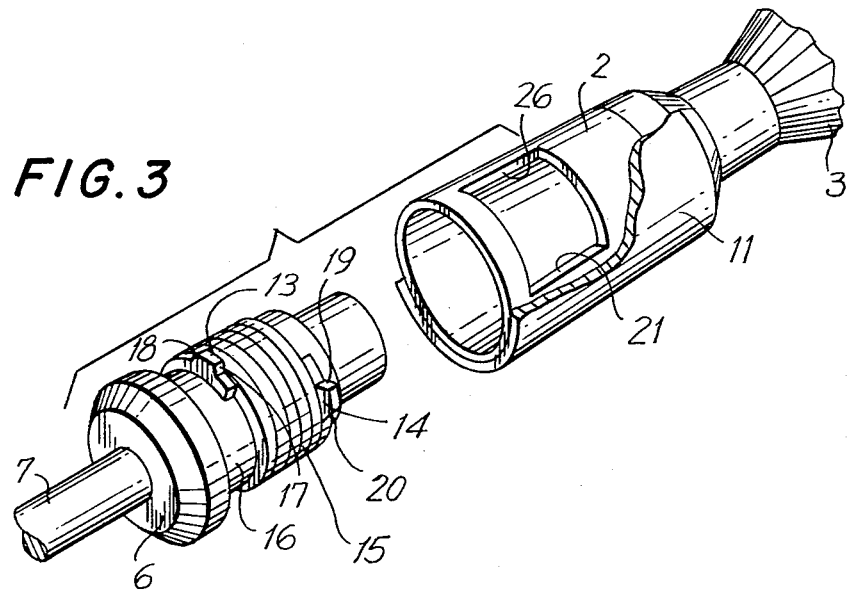
FIG. 3 shows the tool handle in two parts exposing the wrap spring clutch.

The clutch is bi-directional and the direction of operation is determined by the position of shift cylinder 11 which can be seen in FIGS. 1 and 2. The shift cylinder 11 has a key 12 which may be seen most clearly in FIGS. 5-7. Key 12 and shift cylinder 11 act as a single part. Key 12 is a separate piece (although it need not be) only because it is used to hold shift cylinder 11 in place and it must, therefore, be installed last. Shift cylinder 11 and its key 12 are used to selectively engage one or the other of the tabs, shown as 13 and 14 in FIG. 3, which are attached to the ends of the wrap spring 15. Referring still to FIG. 3, wrap spring 15 rides on surface 16 of output hub 6. The inside diameter of spring 15, when it is in its relaxed state, is slightly smaller than the outside diameter of hub surface 16. The spring must, therefore, be slightly expanded in order to place it on the hub. This small diametral interference will cause the spring to tighten about the hub so long as the ends of the spring are allowed to move freely. Spring tabs 13 and 14 are welded or otherwise strongly attached to the ends of spring 15. Forces are exerted on the ends of spring 15 through the actions of input cylinder 2 and shift cylinder 11 which are positioned to contact surfaces 17 and 18 of tab 13, and surfaces 19 and 20 of tab 14.

Referring still to FIG. 3, when a force is applied to surface 17 of tab 13 of spring 15, the spring tends to unwind slightly whereupon it becomes loose and able to move about the hub so long as the force is maintained. If, however, a force is applied to surface 18 on tab 13 the spring tends to become more tightly wound around the hub and motion of the spring relative to the hub is prevented. It will be apparent that similar effects take place if forces are applied to the other tab 14 except, of course, that the directions of the forces and motions will be reversed. The tool handle operates by selectively applying forces to the ends of the spring in this manner. The forces which cause the spring to release its hold on the output hub are applied by key 12 of shift cylinder 11 when it contacts surface 17 or 19. The forces which cause the spring to hug the output hub are applied by input cylinder 2 contacting surfaces 18 or 20.

In operation, only one spring tab is contacted at any time, and that tab is firmly held in position and without play between the shift cylinder key and the input cylinder. The other spring tab must be free to move an necessary without contacting either the key of the shift cylinder or the input cylinder.

Figure 4:
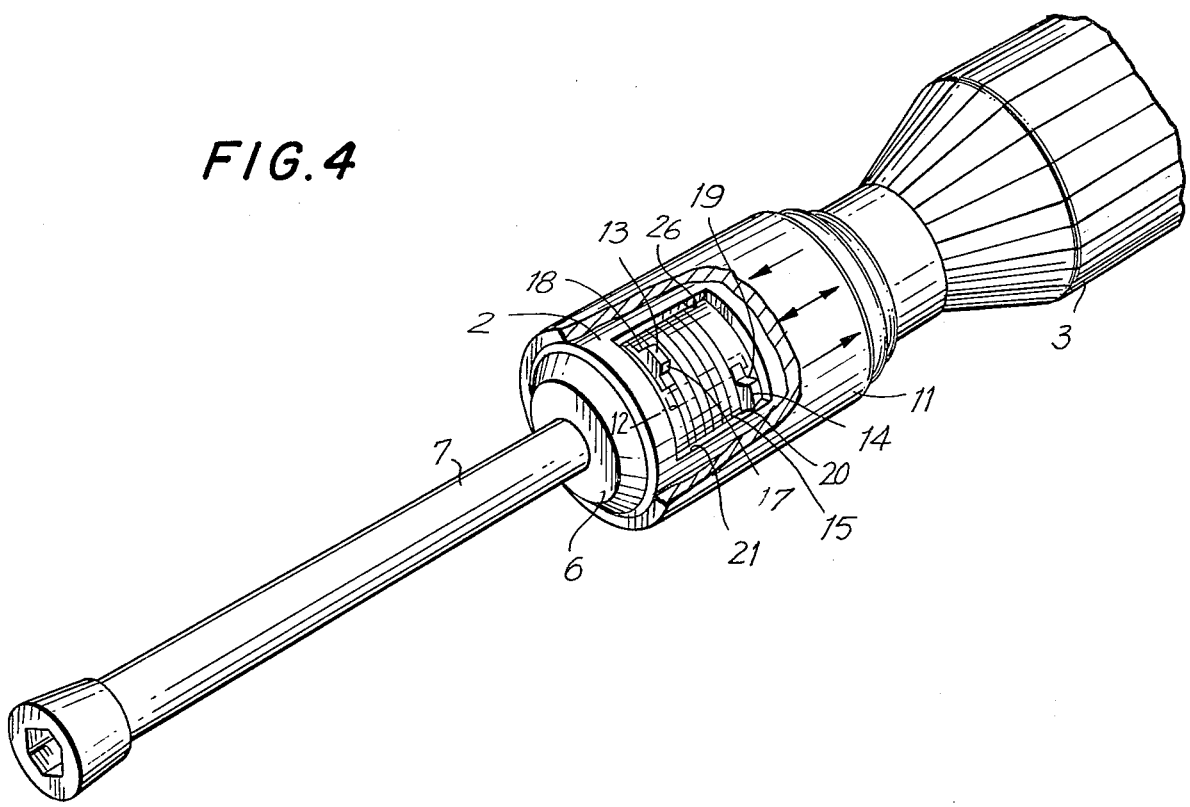
FIG. 4 shows the tool handle with the shift cylinder cut away to expose the wrap spring and its position in relation to the shift cylinder.

To use the tool handle to advance a right handed screw, the shift cylinder 11 must be rotated to its stop in the counterclockwise direction. This will bring key 12 against surface 19 of tab 14 as shown in FIG. 5. The same condition can be seen in FIG. 4, in which the shift cylinder is cut away to expose the parts inside and in which key 12 is shown in phantom. As grip 3 is rotated in the clockwise direction, surface 21 of input cylinder 2 (see FIG. 3) comes into contact with surface 20 of tab 14 of spring 15. The force exerted on the tab tightens the spring about surface 16 of output hub 6, thus causing engagement of the clutch and transmission of the applied torque from grip 3 to blade 7. It is assumed that tool bit 7 is being used to apply a torque in the clockwise direction, as seen by the user, to some external device. This produces a reaction force which takes the form of a restraint on the bit, resisting its clockwise movement. It is important that, during this sequence of movements, no contact occur between tab 13 and key 12 of shift cylinder 11 since even a light contact with tab 13 may cause the spring to release its hold on output hub surface 16 which would allow the grip to turn without forcing the blade to follow the grip motion. Such contact does, in fact, not occur because the shift cylinder moves with the grip as does the wrap spring, tab 13 thus always remaining in front of key 12 in the direction of motion.

When the handle is turned in the reverse direction, that is, in the counterclockwise direction as seen by the user, the blade can remain stationary. As grip 3 is rotated in the counterclockwise direction, shift cylinder 11 moves with it due to the action of the detent spring 22 and ball 23 shown in FIG. 8. The rotation brings key 12 into contact with surface 19 of tab 14, and tends to loosen the grip of spring 15 on surface 16 of output hub 6 in the manner previously described. In this way spring 15 will rotate about hub 6 so long as the rotation of the grip continues in the counterclockwise direction. There is a small amount of friction between the loose spring and hub 6 which will cause the blade to follow the rotation of the grip if there is no restraining force at all on the blade. However, the device on which the tool is being used will normally exert at least some small resistive torque which will keep the blade stationary.

During this motion, surface 26 of input cylinder 2 should not contact surface 18 of tab 13, or else the spring might tighten and grip output hub surface 16. Contact does in fact not take place because the shift cylinder moves with the input cylinder, and the shift cylinder key moves the spring with tab 13 remaining in front of surface 26 in the direction of motion.

Figure 8:
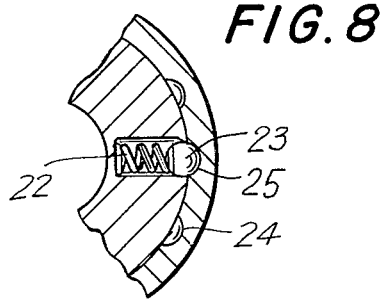
FIG. 8 is a cross-sectional view taken through line 8—8 in FIG. 1, and depicts the mechanism which provides the position detents for the shift cylinder.

To operate the tool handle in the counterclockwise direction, the shift cylinder is held stationary and the grip is rotated in the counterclockwise direction until ball 23 is in detent 24 of FIG. 8. Referring now to FIG. 7, this will position key 12 against surface 17 of tab 13 which will, in turn, be positioned against surface 26 of the opening in input cylinder 2. It will now be obvious that the entire operating sequence described above will function as before, except that all rotational directions will be reversed.

The third position of shift cylinder 11, namely, the center position in which ball 23 is in detent 25 of FIG. 8, is used to lock the grip and the blade together for both directions of rotation. FIG. 6 shows the relative positions of spring tabs 13 and 14, key 12, and surfaces 21 and 26 of the opening in input cylinder 2. Rotation of the grip in either direction brings a surface of the opening in input cylinder 2 against one or the other spring tab, tightening spring 15 around output hub 6. No contact can occur between key 12 and either one of the spring tabs with the result that the spring never becomes loosened on output hub 6 and both directions become driven directions.

In the preferred embodiment of the invention, grip 3 is a molded plastic part, as are blade holding sleeve 8, shift cylinder 11, and key 12. Input cylinder 2 is fabricated from tubular steel. Output hub 6 is made of sintered steel. Music wire with a square cross-section is used for spring 15 in the preferred embodiment; however, any wire of sufficient strength could be used. Tabs 13 and 14 are preferably welded to the ends of spring 15. In order to retain the strength and the toughness inherent in the music wire, it is necessary to restore the proper temper to the wire following the welding operation. Standard heat treatment techniques may be used for this purpose.

The assembly of the mechanism is straightforward. After pin 9 is in position in grip 3, input cylinder 2 is located on the shoulder of grip 3. Spring 15 is then placed inside input cylinder 2. Blade retaining sleeve 8 is placed in the end of output hub 6 which is then inserted into the end of spring 15. Pins 4 and 5 are inserted next and then shift cylinder 11 is positioned with the opening for key 12 between the spring tabs 13 and 14. Key 12 is the final piece which, when it snaps into shift cylinder 11, holds the assembly together.

In the assembled tool handle, the angular spacing between surfaces 18 and 20 on spring tabs 13 and 14 must be less than the angular size of the opening in input cylinder 2 so that when shift cylinder 11 is holding one of the spring tabs in contact with input cylinder 2, the other spring tab cannot touch the input cylinder. In the assembled unit, the angular spacing between spring tabs 13 and 14 must be large enough so that key 12 can be positioned in between tabs 13 and 14 without touching either tab when the shift cylinder is in the center position.

It is important that the only forces exerted on shift cylinder 11 be those necessary to cause spring 15 to slip on output hub 6. These forces are very small, only a few ounces, as compared to the much larger forces, typically in the range of 50 to 100 pounds, which are involved in the forward motion of the tool handle under conditions of full load. The fact that the shift cylinder is not involved in applying load forces to the spring has four important advantages.

(1) There are fewer elements in the chain of mechanical components which must come together to cause movement of grip 3 to be transmitted to the output hub 6. Having extra elements in the mechanical system means that the entire system will have more lost motion because each mechanical element must have some clearance which has to be taken up before the collection of parts can move as a whole.

(2) The mechanical forces involved in the use of the tool handle can be substantial. For instance, it is possible for a strong man to apply 100 inch-pounds of torque to a handle of the sort described herein. If the diameter of the input cylinder were 1 inch, then the force on the spring tab would be 200 pounds. A small mechanical control element which must be easily moved at the touch of a finger and yet which must withstand side loads of 200 pounds is not practical.

(3) The third, or center position of shift cylinder 11 is used to lock the blade to the grip simultaneously for both directions of rotation. A mechanical arrangement to include this mode of operation becomes extremely cumbersome if the control element is in the load chain. However, with the configuration of the present invention this third mode of operation is achieved with great ease. All that is involved is a position of the shift cylinder which is intermediate between the clockwise and the counterclockwise positions, as shown in FIG. 6. In this position the shift cylinder does not touch either spring tab so that the spring is not released in either direction and the input cylinder is able to bear against a spring tab no matter what the direction of rotation.

(4) The shift cylinder holds a spring tab firmly against a side of the opening in the input cylinder so that there is no backlash between these elements of the clutch.

Referring to FIG. 5, for example, it will be seen that tab 14 fits tightly between key 12 and one of the drive surfaces of the input cylinder. This means that when the input cylinder starts to turn, it does not have to "catch up" to tab 14 before the output cylinder can start to turn. The shift cylinder always holds one of the tabs against a drive surface when the drive is set for motion in only one direction, thereby eliminating backlash altogether from the control element. Only when the shift cylinder is in its middle position can there be a slight backlash (see FIG. 6), and even this backlash is minimal. Backlash is very detrimental to the operation of tool handles since each movement of the operator's hand is partially ineffective to the extent that the tool handle has backlash. Many of the previous designs for tool handles use control elements which slide in a direction parallel to the axis of the spring and which engage some feature at an end of the spring. These designs require clearance between the sliding element and the end of the spring. Such clearance inevitably adds to the overall backlash in the system with the expected undesirable results.

The tool handle can be operated by spinning the handle back and forth rapidly between the fingers, without releasing the handle. This method of operation, called spinning, is made possible by the combination of four features: (a) the low slippage torque; (b) the absence of play; (c) the absence of a need to release and regrip the handle; and (d) the tapered shape of the end of the handle permitting pressure on the tool into the screwhead and more rapid spinning due to the reduced diameter at the taper. The absence of any of these four features would make the spinning mode of operation impractical.

The use of the tool handle is electrically isolated from the blade, both when operating the tool handle and when changing the position of the shift cylinder. Other designs in which the control element is in the chain of load bearing elements must use metal parts throughout the chain in order to achieve the necessary strength. The present invention avoids this strength requirement for the reasons previously discussed and, therefore, makes posible the use of plastic parts for the shift cylinder assembly. This use of plastic allows the user to be electrically isolated from the blade which can, therefore, safely come into contact with hardware which is at other than ground potential.

Another possible variation is to use the same clutch backwards, that is, to reverse the roles of the input and output elements. Shifting, in such a configuration, requires that the control element be rotated with respect to the output element. This is not convenient in the type of tool handle described above, but it could by very helpful if such a clutch were to be used on the output of the power tool where the operator has access to the blade rather than to the input element.

Figure 9:
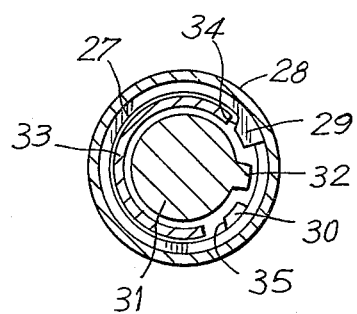
FIG. 9 depicts, in a view similar to those of FIGS. 5-7, an alternative embodiment of the invention.

In the embodiment of the invention depicted in FIG. 9, a spring 27 is fitted inside cylindrical element 28 whose inside surface plays the same role as surface 16 of output hub 6 of the preferred embodiment. Tabs 29 and 30 are attached to the ends of the spring, but they now face toward the center of the spring. The other load bearing element 31, corresponding to input cylinder 2 of the preferred embodiment, is now the central piece with its key 32 being located between the tabs of the spring. Control element 33, corresponding to shift cylinder 11 of the preferred embodiment, is now located between the inner element and the spring so that it can bear against the outside tab surfaces 34 and 35. The operation of this embodiment of the clutch is comparable to that of the preferred embodiment. The action of control element 33 is to release the hold of spring 27 on element 28 by pushing spring 27 and causing it to contract. The clutch is engaged whenever control element 33 does not bear against either spring tab, and key 32 instead bears against a tab in a direction tending to cause it to expand and to bear against the inside surface of element 28. As before, the clutch is bi-directional both as to its sense of rotation and as to the direction of power transmission.

It should be noted that while in FIGS. 1–8 the input element has a small opening, that is not necessary. For example, with tabs separated by 180 degrees, the input cylinder opening would be slightly greater than 180 degrees. Similarly, the angular arc occupied by the shift cylinder key would be increased a corresponding amount. Similar remarks apply to the embodiment of FIG. 9.

Although the invention has been described with reference to particular embodiments, it is to be understood that these embodiments are merely illustrative of the application of the principles of the invention. Numerous modifications may be made therein and other arrangements may be devised without departing from the spirit and scope of the invention.

We claim:

1. A bi-directional spring clutch comprising an input element, a cylindrical output element, a clutch spring, and a control element, the clutch spring being wound in a helix whose inside diameter is slightly smaller than the outside diameter of said output element, the clutch spring being disposed about said output element, the input element being rotatably mounted with respect to said output element and having two load surfaces, the control element being rotatably and concentrically mounted with respect to said input element, and having two control surfaces which can be placed and maintained in at least two positions by rotating the control element with respect to said input element such that in a first of said positions a first of said control surfaces holds a first end of said clutch spring against a first load surface of said input element, and in the second of said positions a second of said control surfaces holds the second end of said clutch spring against a second load surface of said input element, said load surfaces of said input element being configured such that during rotation of said input element in a first direction, and with said control element being in said first position, said first load surface contacts said first end of said clutch spring to cause said clutch spring to tighten about said output element for controlling said output element to rotate along with said input element, and during rotation of said input element in a second direction, and with said control element being in said second position, said second load surface contacts said second end of said clutch spring to cause said clutch spring to tighten about said output element for controlling said output element to rotate along with said input element.

2. A bi-directional clutch in accordance with claim 1 wherein said input element has a tubular shape in which the edges of at least one opening form said first and second load surfaces.

3. A bi-directional clutch in accordance with claim 1 wherein the output element is adapted for rigid connection to a tool bit.

4. A bi-directional clutch in accordance with claim 1 wherein said control element has inward protrusion means for holding the ends of said clutch spring against said first and second load surfaces.

5. A bi-directional clutch in accordance with claim 1 wherein said clutch spring has tabs attached to its ends which extend radially outward from the spring in a direction perpendicular to the axis of the spring, said tabs having surfaces which abut respective load surfaces of said input element and said control surfaces of said control element.

6. A bi-directional clutch in accordance with claim 1 wherein said input element has a tubular shape and is rigidly attached to a grip handle.

7. A bi-directional spring clutch comprising an input element, a cylindrical output element, a clutch spring, and a control element, the clutch spring being wound in a helix whose outside diameter is slightly larger than the inside diameter of the output element, the clutch spring being disposed within said output element, the input element being rotatably mounted with respect to said output element and having two load surfaces, the control element being rotatably and concentrically mounted with respect to said input element, and having two control surfaces which can be placed and maintained in at least two positions by rotating the control element with respect to said input element such that in a first of said positions a first of said control surfaces holds a first end of said clutch spring against a first load surface of said input element, and in the second of said positions a second of said control surfaces holds the second end of said clutch spring against a second load surface of said input element, said load surfaces of said input element being configured such that during rotation of said input element in a first direction, and with said control element being in said first position, said first load surface contacts said first end of said clutch spring to cause said clutch spring to expand against said output element for controlling said output element to rotate along with said input element, and during rotation of said input element in a second direction, and with said control element being in said second position, said second load surface contacts said second end of said clutch spring to cause said clutch spring to expand against said output element for controlling said output element to rotate along with said input element.

8. A bi-directional clutch comprising concentrically mounted input and output cylindrically shaped elements; a helically wound spring having two ends, said spring being disposed concentrically with and between said input and output elements; sufficient clearance being provided between said input and output elements such that said spring can slightly contract and expand as it is wound and unwound, thereby allowing selective engagement of said spring with said output element; said input element having two surfaces, each adapted to engage a respective end of said spring and, if said spring is not otherwise loosened, causing it to tighten against said output element when said input element is rotated in a respective direction; and a control element, mounted for shiftable positioning along the circumference of said input element, but otherwise rotating with said input element; said control element having means for engaging a selected one of said two ends of said spring, in accordance with the position of said control element relative to said input element, for causing said spring to loosen from said output element when said input element is rotated in a respective direction.

9. A bi-directional clutch in accordance with claim 8 wherein said control element has at least two positions in which it can be maintained relative to said input element, said engaging means being located in each of said at least two positions such that as said input element is rotated in a first direction said engaging means rotates with it and engages a respective end of said spring prior to a first surface of said input element reaching the other end of said spring thereby preventing said first surface from reaching said other end of said spring, and as said input element is rotated in a second direction a second surface of said input element bears against said respective end of said spring prior to said engaging means engaging said other end of said spring thereby preventing said engaging means from reaching said other end of said spring.

10. A bi-directional clutch in accordance with claim 9 wherein said control element has a third position, intermediate said at least two positions, in which it can be maintained relative to said input element; said engaging means being located in said third position such that as said input element is rotated in either direction one of said two surfaces of said input element bears against a respective end of said spring prior to said engaging means engaging the other end of said spring thereby preventing said engaging means from reaching said other end of said spring.

11. A bi-directional clutch in accordance with claim 10 wherein said input element is mounted around said output element, said spring has an inner diameter which is slightly smaller than the outer diameter of said output element such that said spring is normally in tight contact around said output element, and torque is transmitted from said input element to said output element by either surface of said input element bearing against a respective end of said spring and causing said spring and said output element to rotate therewith while said engaging means is thus prevented from reaching the other end of said spring to unwind it.

12. A bi-directional clutch in accordance with claim 10 wherein said output element is mounted around said input element, said spring has an outer diameter which is slightly larger than the inner diameter of said output element such that said spring is normally in tight contact against said output element, and torque is transmitted from said input element to said output element by either surface of said input element bearing against a respective end of said spring and causing said spring and said output element to rotate therewith while said engaging means is thus prevented from reaching the other end of said spring to unwind it.

13. A bi-directional clutch in accordance with claim 10 wherein, for each of said at least two positions of said control element, a respective end of said spring is held in contact with both said engaging means and a respective surface of said input element.

14. A bi-directional clutch in accordance with claim 9 wherein said input element is mounted around said output element, said spring has an inner diameter which is slightly smaller than the outer diameter of said output element such that said spring is normally in tight contact around said output element, and torque is transmitted from said input element to said output element by either surface of said input element bearing against a respective end of said spring and causing said spring and said output element to rotate therewith while said engaging means is thus prevented from reaching the other end of said spring to unwind it.

15. A bi-directional clutch in accordance with claim 9 wherein said output element is mounted around said input element, said spring has an outer diameter which is slightly larger than the inner diameter of said output element such that said spring is normally in tight contact against said output element, and torque is transmitted from said input element to said output element by either surface of said input element bearing against a respective end of said spring and causing said spring and said output element to rotate therewith while said engaging means is thus prevented from reaching the other end of said spring to unwind it.

16. A bi-directional clutch in accordance with claim 8 wherein said input element is mounted around said output element, said spring has an inner diameter which is slightly smaller than the outer diameter of said output element such that said spring is normally in tight contact around said output element, and torque is transmitted from said input element to said output element by either surface of said input element bearing against a respective end of said spring and causing said spring and said output element to rotate therewith while said engaging means is thus prevented from reaching the other end of said spring to unwind it.

17. A bi-directional clutch in accordance with claim 16 wherein, for each of said at least two positions of said control element, a respective end of said spring is held in contact with both said engaging means and a respective surface of said input element.

18. A bi-directional clutch in accordance with claim 8 wherein said output element is mounted around said input element, said spring has an outer diameter which is slightly larger than the inner diameter of said output element such that said spring is normally in tight contact against said output element, and torque is transmitted from said input element to said output element by either surface of said input element bearing against a respective end of said spring and causing said spring and said output element to rotate therewith while said engaging means is thus prevented from reaching the other end of said spring to unwind it.

19. A bi-directional clutch in accordance with claim 18 wherein, for each of said at least two positions of said control element, a respective end of said spring is held in contact with both said engaging means and a respective surface of said input element.

20. A bi-directional clutch in accordance with claim 8 wherein, for each of at least two positions of said control element, a respective end of said spring is held in contact with both said engaging means and a respective surface of said input element.

* * * * *